(12) United States Patent
Gehman

(10) Patent No.: US 12,247,631 B2
(45) Date of Patent: Mar. 11, 2025

(54) LUBRICATION SYSTEM

(71) Applicant: K.M. Gehman Incorporated, Souderton, PA (US)

(72) Inventor: K. Marlin Gehman, Harleysville, PA (US)

(73) Assignee: K.M. Gehman Incorporated, Souderton, PA (US)

( * ) Notice: Subject to any disclaimer, the term of this patent is extended or adjusted under 35 U.S.C. 154(b) by 0 days.

(21) Appl. No.: 18/593,560

(22) Filed: Mar. 1, 2024

(65) Prior Publication Data

US 2024/0200629 A1 Jun. 20, 2024

Related U.S. Application Data

(63) Continuation of application No. 18/180,461, filed on Mar. 8, 2023, which is a continuation of application
(Continued)

(51) Int. Cl.
*F16F 1/376* (2006.01)
*B60G 7/00* (2006.01)
(Continued)

(52) U.S. Cl.
CPC .............. *F16F 1/376* (2013.01); *B60G 7/001* (2013.01); *B60G 7/02* (2013.01); *B60G 11/003* (2013.01); *F16F 1/3732* (2013.01); *B60G 2200/14* (2013.01); *B60G 2202/14* (2013.01); *B60G 2204/143* (2013.01); *B60G 2204/41* (2013.01); *B60G 2204/422* (2013.01); *B60G 2206/12* (2013.01); *B60G 2206/16* (2013.01);
(Continued)

(58) Field of Classification Search
CPC ........ F16F 2230/04; F16F 1/38; F16F 1/3835; F16F 2224/025; F16F 1/376; B60G 21/052; B60G 2202/14; B60G 2206/73; B60G 2204/41; B60G 11/003
See application file for complete search history.

(56) References Cited

U.S. PATENT DOCUMENTS 2,855,212 A 10/1958 Houser
6,513,801 B1 2/2003 McCarthy
(Continued)

FOREIGN PATENT DOCUMENTS

CA 2732392 A1 8/2012
DE 102010054732 A1 6/2012
(Continued)

OTHER PUBLICATIONS

Spring Front Eye Urethane Bush Kit, 5 pgs, dated Oct. 17, 2019, www.rfauto.biz/Eng/news/pro.asp?id=927.
SuperPro Suspension Parts, 8 pgs, www.superpro.com.au.

*Primary Examiner* — Paul N Dickson
*Assistant Examiner* — Maxwell L Meshaka
(74) *Attorney, Agent, or Firm* — Duane Morris LLP

(57) ABSTRACT

A lubrication system includes a coupling; a bushing in the coupling; a lubricant inlet to the coupling; a flat surface against a front surface of the bushing; and a path for lubricant to flow from the lubricant inlet to a groove on the front surface of the bushing and out between the flat surface and the front surface to lubricate an interface between the flat surface and the front surface.

19 Claims, 4 Drawing Sheets

Related U.S. Application Data

No. 17/653,292, filed on Mar. 3, 2022, now Pat. No. 11,603,897, which is a continuation of application No. 17/060,122, filed on Oct. 1, 2020, now Pat. No. 11,293,511.

(60) Provisional application No. 62/910,906, filed on Oct. 4, 2019.

(51) Int. Cl.
  *B60G 7/02* (2006.01)
  *B60G 11/00* (2006.01)
  *F16F 1/373* (2006.01)

(52) U.S. Cl.
  CPC .... *B60G 2206/73* (2013.01); *F16F 2224/025* (2013.01); *F16F 2228/001* (2013.01); *F16F 2230/04* (2013.01); *F16F 2234/02* (2013.01)

(56) References Cited

U.S. PATENT DOCUMENTS

| | | | |
|---|---|---|---|
| 8,075,005 B1 | 12/2011 | Ryshavy et al. | |
| 10,422,372 B2 | 9/2019 | Cox | |
| 10,577,024 B2 | 3/2020 | Flickinger et al. | |
| 11,293,511 B2* | 4/2022 | Gehman | F16F 1/3835 |
| 11,603,897 B2* | 3/2023 | Gehman | B60G 7/001 |
| 11,953,070 B2* | 4/2024 | Gehman | F16F 1/3732 |
| 2010/0124455 A1* | 5/2010 | Zaloga | F16C 11/02 |
| | | | 403/120 |
| 2018/0215414 A1 | 8/2018 | Van Deventer et al. | |
| 2019/0128320 A1* | 5/2019 | Cox | F16C 33/106 |
| 2019/0389513 A1* | 12/2019 | Flickinger | F16F 15/08 |
| 2021/0102592 A1* | 4/2021 | Gehman | F16F 1/3835 |
| 2022/0186806 A1* | 6/2022 | Gehman | F16F 1/376 |
| 2023/0220900 A1* | 7/2023 | Gehman | F16F 1/3835 |
| | | | 280/124.134 |
| 2024/0200629 A1* | 6/2024 | Gehman | F16F 1/376 |

FOREIGN PATENT DOCUMENTS

| | | | | |
|---|---|---|---|---|
| DE | 102021126786 A1 * | 5/2023 | ........... | B60G 21/055 |
| KR | 20110023274 A | 3/2011 | | |
| KR | 102257299 B1 | 5/2021 | | |
| WO | WO-2014042038 A1 * | 3/2014 | ........... | B23P 11/005 |
| WO | WO-2022126524 A1 * | 6/2022 | | |

* cited by examiner

LUBRICATION SYSTEM

CROSS REFERENCE TO RELATED APPLICATIONS

This application claims the benefit of U.S. application Ser. No. 18/180,461, filed Mar. 8, 2023; Ser. No. 17/653,292, filed on Mar. 3, 2022, now U.S. Pat. No. 11,603,897; and Ser. No. 17/060,122, filed on Oct. 1, 2020, now U.S. Pat. No. 11,293,511, which claim priority under 35 U.S.C. § 119(e)(1) to U.S. Provisional Application Ser. No. 62/910,906, filed on Oct. 4, 2019, which are all hereby incorporated by reference for all purposes as if fully set forth herein.

BACKGROUND

Bushings are often used to provide an interface between two moving parts in order to allow the parts to move freely with respect to one another and to reduce the transmission of vibration. One common application for bushings is in vehicle suspension systems, such as in the connection between the control arm and the vehicle chassis.

In some applications, grease is supplied to the bushing to minimize friction between the inner face of the bushing and a sleeve disposed within the bushing. The grease may be supplied by connecting a grease gun to a fitting or nipple coupled to the bushing (e.g., a Zerk fitting). However, with prior art bushings, over supply of grease can cause deformation or displacement of the bushing along with other issues. Such oversupply of grease is common and can cause additional work to alleviate the issue.

SUMMARY

In an embodiment, a lubrication system includes a coupling; a bushing in the coupling; a lubricant inlet to the coupling; a flat surface against a front surface of the bushing; and a path for lubricant to flow from the lubricant inlet to a groove on the front surface of the bushing and out between the flat surface and the front surface to lubricate an interface between the flat surface and the front surface.

In an aspect, the bushing includes: a cylindrical body; a bore through the body; and a flange extending from the body that includes the front surface and an outer rim having a diameter greater than a diameter of the body.

In an aspect, the lubrication system further includes a sleeve configured to be located in a bore through the bushing and to receive a shaft, bolt, or other member to couple the bushing to the flat surface.

In an aspect, the path extends between a sleeve located in a bore of the bushing and an inner surface of the bore.

In an aspect, the coupling is connected to a control arm.

In an aspect, the control arm includes two arms, each arm having the coupling for coupling the control arm to a chassis of a vehicle.

In an aspect, the control arm includes a ball joint.

In an aspect, the bushing is made of a plastic or an elastomeric material.

In an aspect, the path includes a recessed channel extending along an inner surface of a bore through the bushing to the groove.

In an aspect, the groove includes an inner end intersecting with an end of a channel in a surface of a bore through the bushing, and extends radially from the bore.

In an aspect, the groove traverses an arcuate path on the front surface of the bushing.

In an aspect, the groove comprises a first groove and a second groove, the first and the second grooves each extend from a first end to a second end, and the first ends of the first and the second grooves are coincident.

In an aspect, the first and the second grooves diverge as they extend from the respective first ends to the respective second ends.

In an aspect, the lubrication inlet is a Zerk fitting.

In an aspect, the bushing includes a plurality of channels defined in an inner surface of a bore that each extend substantially parallel to a longitudinal axis of the bore.

In an aspect, each of the plurality of channels extend along a portion of the bushing.

In an aspect, the bushing includes a plurality of channels defined in an inner surface of a bore that extend in a curved path.

In an aspect, each of the plurality of channels extend along a portion of the bushing.

In an aspect, each of the plurality of channels have a depth of between about 1 mm and about 2 mm.

In an aspect, the groove extends to an end adjacent to an outer rim of the bushing.

BRIEF DESCRIPTION OF THE DRAWINGS

The features described herein will be more fully disclosed in the following detailed description, which is to be considered together with the accompanying drawings wherein like numbers refer to like parts and further wherein.

DETAILED DESCRIPTION

Figure 1:
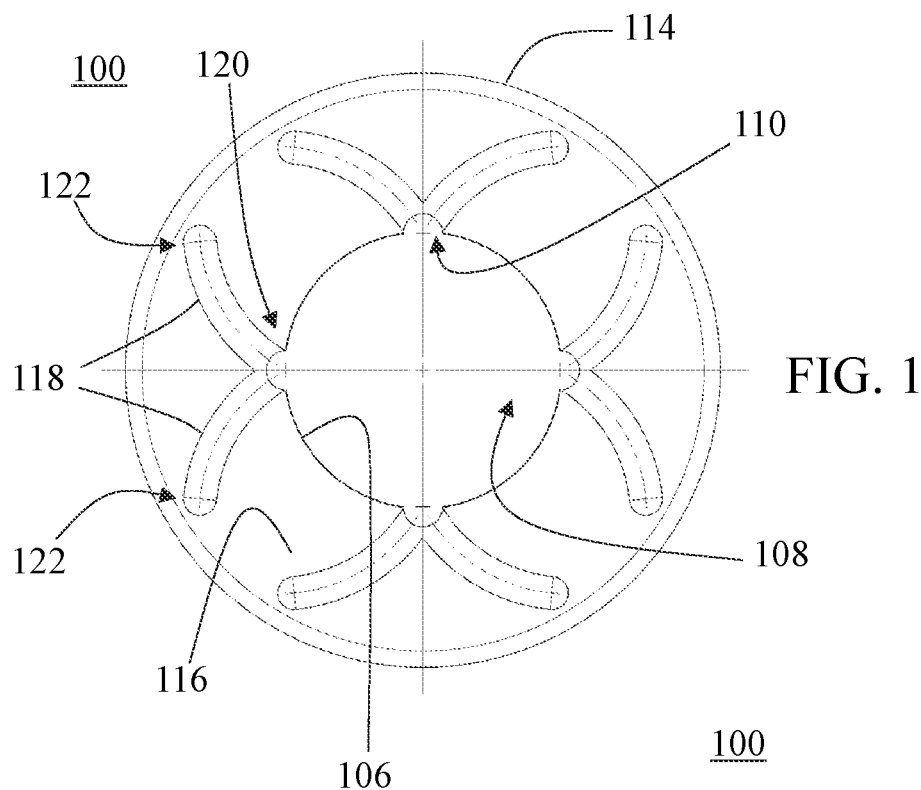
FIG. 1 is a front view of a bushing, according to an embodiment described herein.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 2:
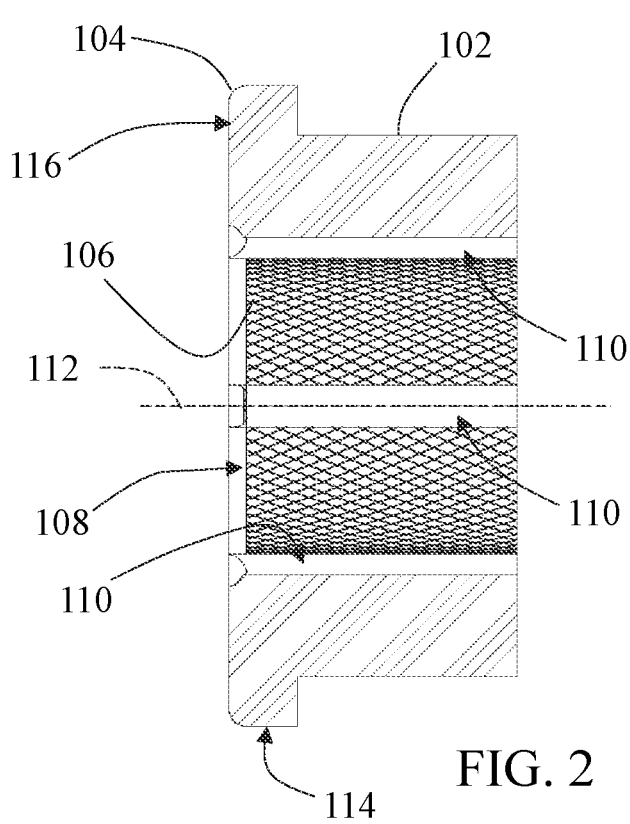
FIG. 2 is a cross-sectional view of the bushing of FIG. 1.

FIGS. 1-2 show one embodiment of a bushing 100. The bushing 100 includes a cylindrical body 102 and a flange 104. The bushing 100 can be constructed of any appropriate material, such as, for example, a plastic or elastomeric material. The cylindrical body 102 has an inner face 106 that defines an inner bore 108. A plurality of channels 110 are formed in the inner face 106. As shown, the channels 110 can be axial channels 110 that extend substantially parallel to an axis 112 of the bore 108. In other embodiments (not shown), the channels 110 can follow a curved path, for example. In various embodiments, the channels 110 have a depth of between about 1 mm and about 2 mm. Although shown extending the entire length of the bushing 100, in other embodiments, the channels 110 extend along only a portion of the bushing 100. In various embodiments, the inner face 106 is knurled.

The flange 104 extends from the cylindrical body 102 at an end of the cylindrical body 102. The flange 104 includes an outer rim 114 and a front face 116 extending radially between the bore 108 and the outer rim 114. A plurality of grooves 118 are formed in the front face 116. Each of the grooves 118 extend from a first end 120 that intersects the bore 108 to a second end 122 adjacent the outer rim 114. In various embodiments, as shown in FIGS. 1-2, the second ends 122 of the grooves 118 do not extend through the outer rim 114. In such embodiments, the second end 122 of the grooves 118 may be spaced apart from the outer rim 114 by between about 3 mm and about 4 mm, for example. Spacing the second ends 122 of the grooves 118 away from the outer rim 114 may prevent grease from escaping during normal operation, with grease only escaping due to the pressure supplied when excess grease is injected. In other embodiments (not shown), the grooves 118 may extend through the outer rim 114. In various embodiments, the grooves 118 have a width of between about 2 mm and about 3.5 mm. In various embodiments, the grooves 118 have a depth of between about 1 mm and about 2 mm.

In various embodiments, as shown in FIG. 1, the grooves 118 follow an arcuate path from the first end 120 to the second end 122. For example, the grooves 118 can follow a curved path having a radius of about 15 mm. In other embodiments, the grooves 118 are straight and, for example, extend radially along the front face 116 from the first end 120 to the second end 122.

In various embodiments, the front face 116 includes connected sets of grooves 118 each having a first and second groove that are coincident at the respective first ends 120 but diverge from each other toward their respective second ends 122. The bushing 100 may include multiple of such sets, such as, for example, four sets of grooves 118. In various embodiments, the grooves 118 on the front face 116 are rotationally symmetric. The inclusion of multiple grooves 118 spaced around the face 116, along with the arcuate path of the grooves 118, may allow grease to evenly coat the face 116.

As shown, the channels 110 formed in the inner face 106 may intersect with the grooves 118 at the respective first end 120 of the grooves 118. As described further herein, this may allow grease to travel through the channels 110, into the grooves 118 and toward the outer rim 114. This may allow excess grease to escape. This may prevent the excess grease from causing deformation or displacement of the bushing 100. The bushing 100 can include any number of channels 110 in the inner face 106 and, in various embodiments, includes one channel 110 intersecting each of the grooves 118.

Figure 3:
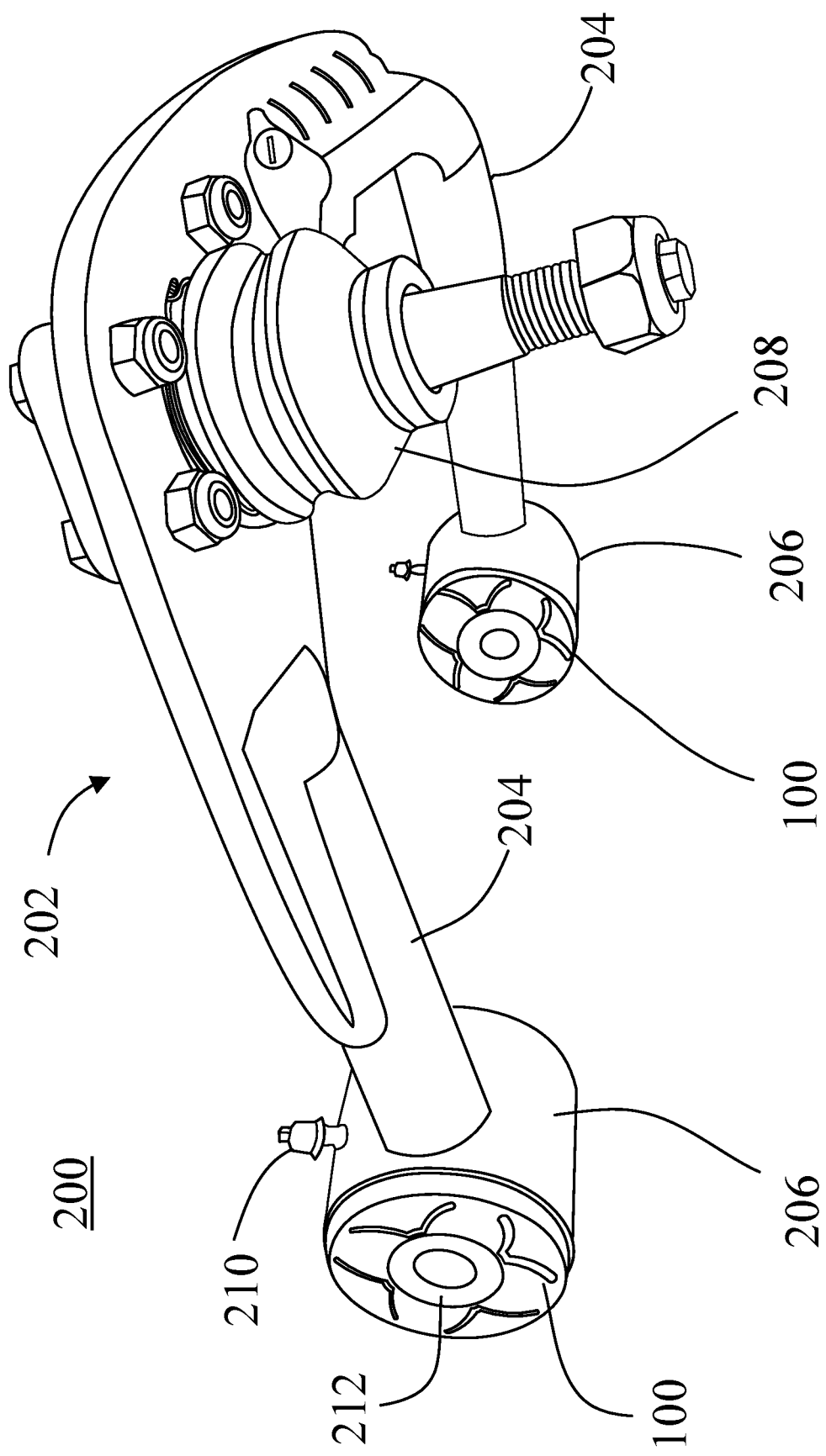
FIG. 3 is a perspective view of an apparatus including a control arm and bushings according to an embodiment described herein.
Figure 4:
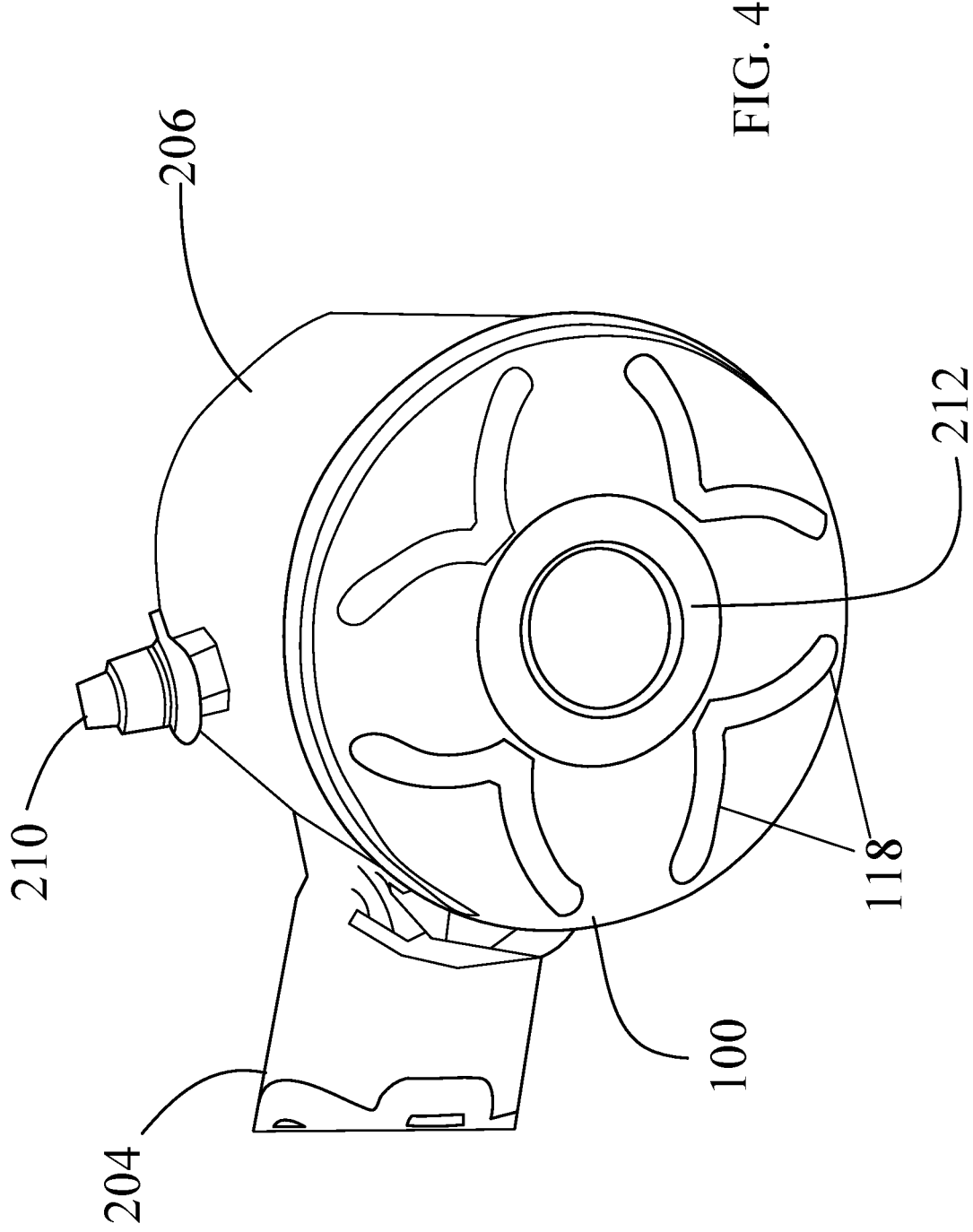
FIG. 4 is a detail view of the coupling portion of the control arm of FIG. 3 with a bushing disposed therein.

FIG. 3 shows an apparatus 200 including a control arm 202 for a vehicle suspension. The control arm 202 includes two arms 204 each having a coupling portion 206 for coupling the control arm to a chassis of the vehicle. The coupling portion 206 may be in the form of a sleeve and is sometimes referred to in the art as a "bong." The control arm 202 may further include a ball joint 208 for coupling to a wheel upright or hub of the vehicle. The coupling portions 206 each include a grease fitting 210, such as, for example, a Zerk fitting.

The apparatus 200 further includes bushings 100 disposed in the coupling portions 206. The bushings 100 can be according to any of the embodiments described herein. The apparatus 200 can include two bushings 100 disposed in each coupling portion 206 with the flange 104 of one bushing 100 on each side of the coupling portion 206. A space may exist between the bushings 100 such that grease can be injected through the grease fitting 210, as described further herein.

The apparatus 200 may further include sleeves 212 disposed in the bores 108 of the bushings 100. The sleeves 212 are configured to receive a shaft, bolt, or other member to couple the control arm 202 to the chassis of the vehicle. As described above, the inner face 106 of the bushing 100 may be knurled. This may allow grease to flow between the inner face 106 and the sleeve 212 to facilitate rotation of the bushing 100 (and the coupling portion 206) around the sleeve 212. In addition, the knurl may act to entrap grease in the space between the inner face 106 and the sleeve 212 to ensure that the interface between them is lubricated.

Figure 5:
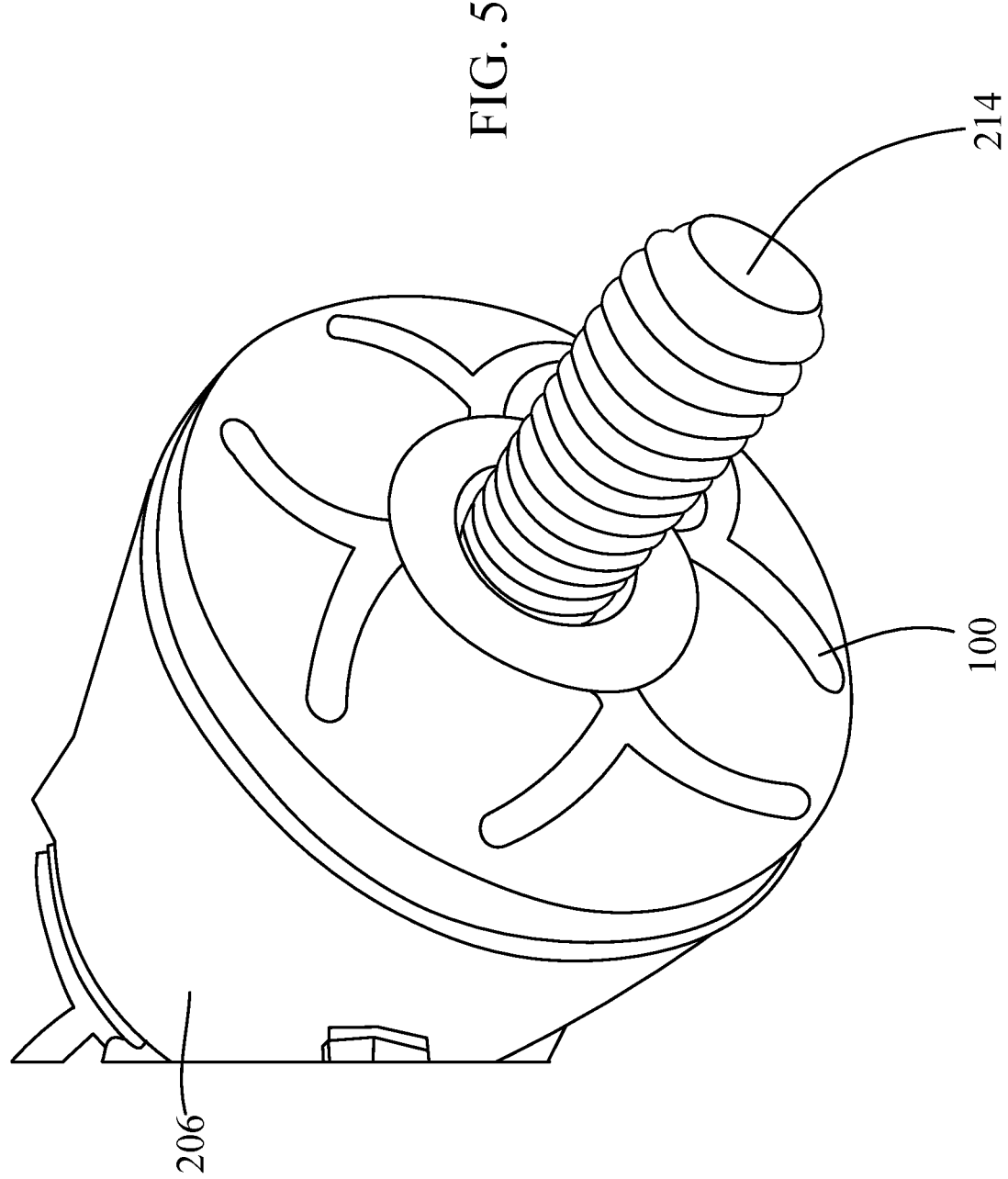
FIG. 5 is a detail view of the coupling portion with a bolt extending through the sleeve.

When coupled to a vehicle chassis, a washer or other disc (not shown) may be placed against the flange of each bushing 100 in the coupling portion 206 of the control arm 202. In other applications, the front face 116 of one of the bushings 100 is placed against a surface of a component of the vehicle (e.g., a portion of the chassis or body of the vehicle). A bolt 214 may be positioned through the sleeve 212 to couple the control arm 202 to the chassis, as shown in FIG. 5. A nut or other fastener (not shown) may engage the bolt or shaft to secure the control arm 202 to the chassis and facilitate contact between the front face 116 of the bushing 100 and the mating washer or surface of the vehicle. During operation, the sleeve 212 may remain fixed as a result of the engagement of the bolt 212 and nut. After attachment of the control arm to the chassis, a grease gun can be coupled to the grease fitting 210 to inject grease into the coupling portion 206 and into the space between the inner face 106 of the bushing 100 and the sleeve 212 to facilitate rotation of the coupling portion 206 and the bushing 100 around the sleeve 212. Further, the grease that is injected may flow through the grooves 118 to lubricate the interface between the front face 116 and the washer or surface of the vehicle that this in contact with the front face 116.

As noted above, a space may exist between the bushings 100 within the coupling portion 206 to allow the passage of the grease. With prior art bushings, when grease was injected, excess grease would have no path to escape. Hence, injection of excess grease could cause deformation or displacement of the bushing. With the bushings 100 described herein, excess grease can flow through the channels 110 and to the grooves 118 where the grease can escape from the assembly, between the flange 104 and the washer or surface of the vehicle that is in contact with the front face 116. As a result, the excess grease does not cause deformation or displacement of the bushing 100, thereby avoiding additional steps associated with removing the excess grease.

A method may include providing a control arm for a vehicle suspension. The method may further include inserting a first bushing into a coupling portion of the control arm. The method may further include inserting a second bushing into a coupling portion of the control arm. The method may further include inserting one or more sleeves into a bore defined by the first and/or second bushings. The method may further include sliding the coupling portion over a bolt of the vehicle chassis with the bolt disposed within the sleeves. The method may further include placing a washer against a front face of the second bushing or, alternatively, placing a face of the second bushing against a surface of a component of the vehicle. The method may further include placing a washer against a front face of the first bushing. The method may further include coupling a nut to the bolt and tightening the nut against the washer in contact with the front face of the first bushing. The method may further include coupling a grease gun to a grease fitting on the coupling portion of the control arm. The method may further include injecting grease into the coupling portion such that grease flows out of the bore of the first and/or second bushings and through grooves on the respective front faces of the bushings. When injected, the excess grease may flow through channels defined in the inner face of the bushings defining the inner bores to reach the grooves on the front face.

While the foregoing description and drawings represent preferred or exemplary embodiments of the present disclosure, it will be understood that various additions, modifications and substitutions may be made therein. In particular, it will be clear to those skilled in the art that the embodiments disclosed herein may be embodied in other forms, structures, arrangements, proportions, sizes, and with other elements, materials, and components, without departing from the spirit or essential characteristics thereof. One skilled in the art will further appreciate that the bushings and apparatuses described herein may be used with many modifications of structure, arrangement, proportions, sizes, materials, and components and otherwise that are particularly adapted to specific environments and operative requirements without departing from the principles disclosed herein. The presently disclosed embodiments are therefore to be considered in all respects as illustrative and not restrictive.

What is claimed is:

1. A lubrication system comprising:
   a coupling;
   a bushing in the coupling;
   a lubricant inlet to the coupling;
   a flat surface against a front surface of the bushing; and
   a path for lubricant to flow from the lubricant inlet to a groove on the front surface of the bushing and out between the flat surface and the front surface to lubricate an interface between the flat surface and the front surface, wherein the groove extends to an end adjacent to an outer rim of the bushing.

2. The lubrication system of claim 1, wherein the bushing includes:
   a cylindrical body;
   a bore through the body; and
   a flange extending from the body that includes the front surface and an outer rim having a diameter greater than a diameter of the body.

3. The lubrication system of claim 1, further comprising a sleeve configured to be located in a bore through the bushing and to receive a shaft, bolt, or other member to couple the bushing to the flat surface.

4. The lubrication system of claim 1, wherein the path extends between a sleeve located in a bore of the bushing and an inner surface of the bore.

5. The lubrication system of claim 1, wherein the coupling is connected to a control arm.

6. The lubrication system of claim 5, wherein the control arm includes two arms, each arm having the coupling for coupling the control arm to a chassis of a vehicle.

7. The lubrication system of claim 5, wherein the control arm includes a ball joint.

8. The lubrication system of claim 1, wherein the bushing is made of a plastic or an elastomeric material.

9. The lubrication system of claim 1, wherein the path includes a recessed channel extending along an inner surface of a bore through the bushing to the groove.

10. The lubrication system of claim 1, wherein the groove includes an inner end intersecting with an end of a channel in a surface of a bore through the bushing, and extends radially from the bore.

11. The lubrication system of claim 1, wherein the groove traverses an arcuate path on the front surface of the bushing.

12. The lubrication system of claim 1, wherein
   the groove comprises a first groove and a second groove,
   the first and the second grooves each extend from a first end to a second end, and
   the first ends of the first and the second grooves are coincident.

13. The lubrication system of claim 12, wherein the first and the second grooves diverge as they extend from the respective first ends to the respective second ends.

14. The lubrication system of claim 1, wherein the lubrication inlet is a Zerk fitting.

15. The lubrication system of claim 1, wherein the bushing includes a plurality of channels defined in an inner surface of a bore that each extend substantially parallel to a longitudinal axis of the bore.

16. The lubrication system of claim 15, wherein each of the plurality of channels extend along a portion of the bushing.

17. The lubrication system of claim 1, wherein the bushing includes a plurality of channels defined in an inner surface of a bore that extend in a curved path.

18. The lubrication system of claim 17, wherein each of the plurality of channels extend along a portion of the bushing.

19. The lubrication system of claim 15, wherein each of the plurality of channels have a depth of between about 1 mm and about 2 mm.

* * * * *